(No Model.) 3 Sheets—Sheet 3.
M. G. HUBBARD.
STREET CAR GEAR.

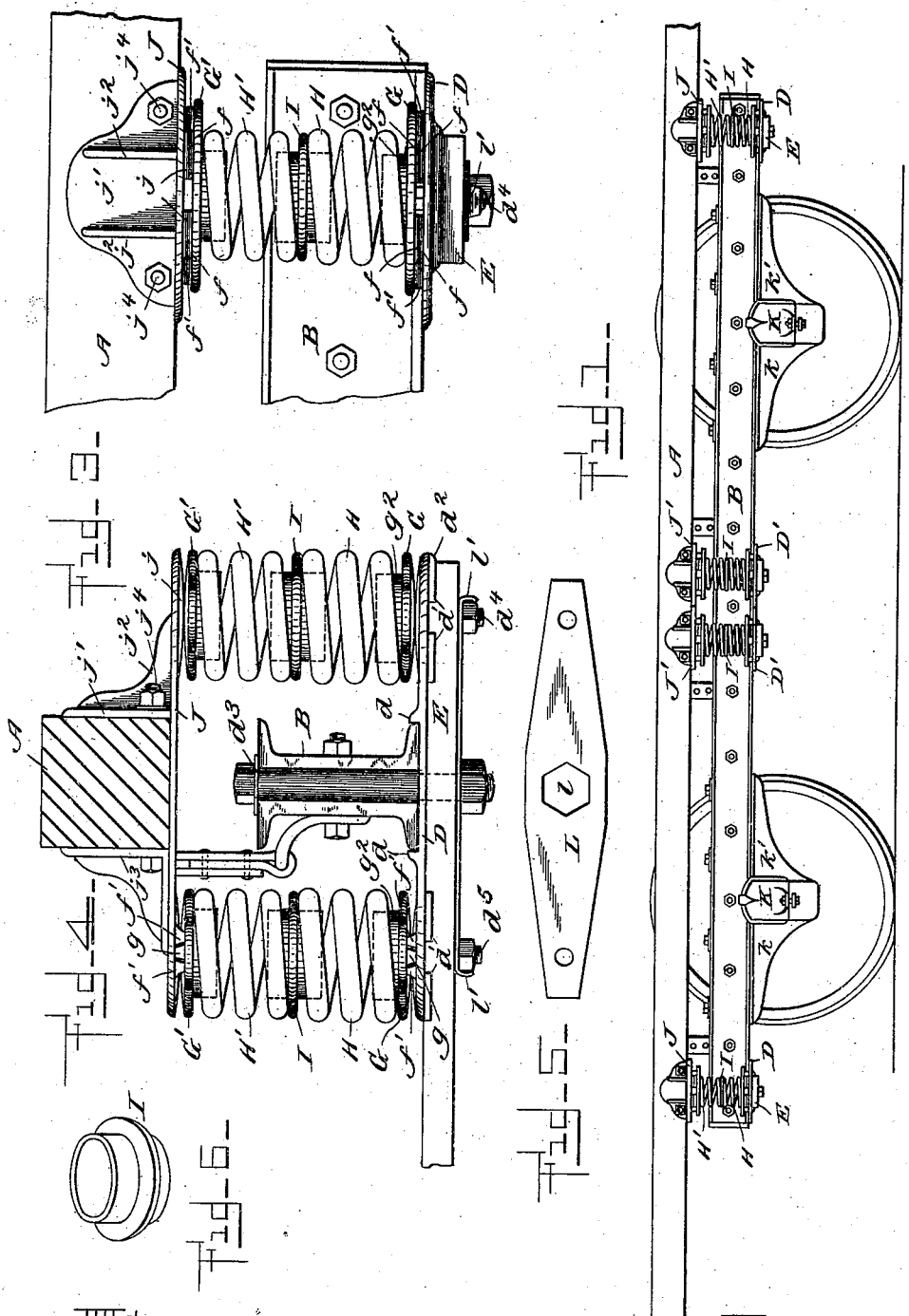

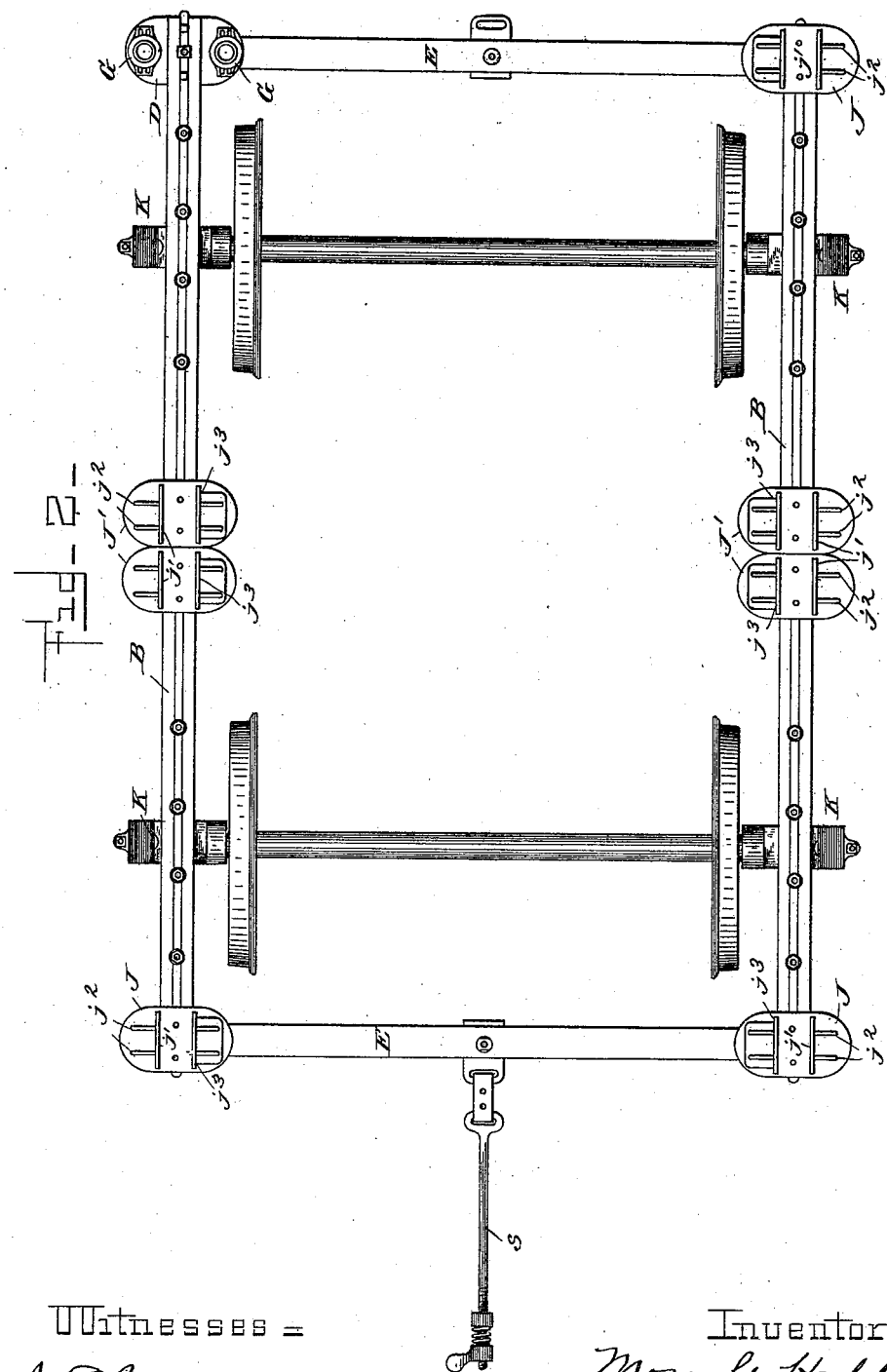

No. 503,142. Patented Aug. 15, 1893.

Witnesses:
N. L. Collamer.
J. L. Smith.

Inventor:
Moses G. Hubbard,
By A. M. Smith & Son
Attys

UNITED STATES PATENT OFFICE.

MOSES G. HUBBARD, OF CHICAGO, ILLINOIS.

STREET-CAR GEAR.

SPECIFICATION forming part of Letters Patent No. 503,142, dated August 15, 1893.

Application filed September 26, 1892. Serial No. 446,944. (No model.)

*To all whom it may concern:*

Be it known that I, MOSES G. HUBBARD, a citizen of the United States, and a resident of Chicago, county of Cook, and State of Illinois, have invented a new and useful Improvement in Street-Car Gears, of which the following is a full, clear, and exact description, reference being had to the accompanying drawings, making part of this specification.

My invention relates to the construction of a short wheel base, four wheel truck, adapted to carry a long car body without the excessive longitudinal rocking which occurs in all the present forms of construction of a short wheel base truck applied to a long car body.

My invention further relates to certain improved details of construction and arrangement to further perfect this style of car truck and better adapt it to the purposes set forth.

Figure 7:
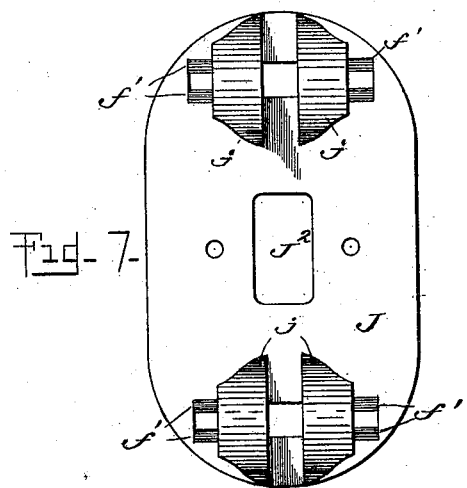
Figure 10:
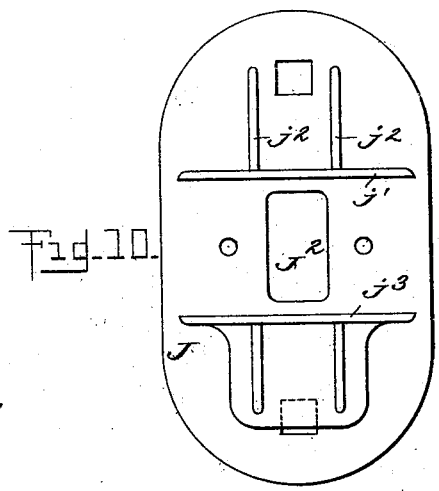
Figure 8:
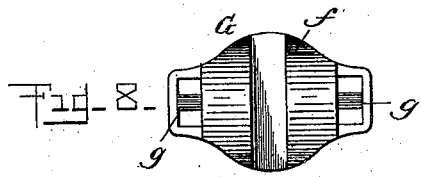
Figure 11:
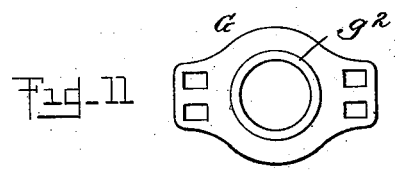
Figure 9:
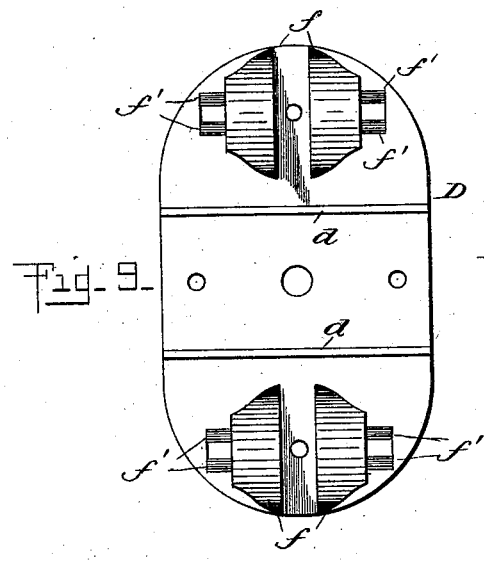
Figure 12:
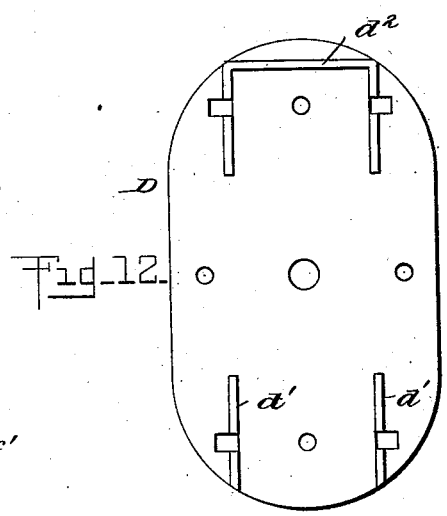

In the accompanying drawings—Figure 1 represents, in side elevation, my improved truck with one of the car side sills attached. Fig. 2, is a plan view of the truck. Fig. 3, is a side view, enlarged, of one end of the truck frame, a portion of a car side sill and one of its double springs and connections. Fig. 4, is a front elevation of one end of an end sill and the springs thereon, showing the wheel piece in end elevation and the car side sill in section. Fig. 5, is a plan view of the nut lock plate; Fig. 6, a perspective view of a compound-spring coupling ring, and Figs. 7, 8, 9, 10, 11 and 12 detail views of the spring seat and rocker plates.

A indicates one of the car side sills, and B, the car truck wheel pieces, the latter made preferably in the form of an I-beam, composed of two channel-iron bars clamped to an interposed beam of wood, as described in Letters Patent granted to me March 11, 1890, No. 423,158. They are united through spring-seat corner plates D (Figs. 9 and 12) to end sills E, having on their upper faces parallel, longitudinal ribs $d, d$, which embrace the lower edge of the wheel piece between them, and, on their lower faces, the transverse ribs $d', d'$, which in like manner embrace the transverse sill E, and an end rib or flange $d^2$, to hide the joint. By this construction of the corner pieces and the aid of a large through bolt at $d^3$, passing through the end sill, corner piece, and wooden center of the I-beam, wheel piece, the parts are firmly locked in the desired position. Additional bolts, at $d^4$ and $d^5$, further stiffen the connection of these corner pieces with the wheel pieces and end sills. These pieces D, as explained, are located at the junction of the end sills with the wheel pieces and at or near the ends of the latter, with their greater length transverse thereto, as shown, and at or near the center of the length of each wheel piece, a pair of similar plates D', D', are located, provided with upper, longitudinal ribs embracing the sill E, to which they are secured by bolts at $d^3$ and $d^4$. These plates D', D', are arranged side by side, as shown, and, together with the corner plates D, are provided on their upper faces, at their ends, with rocker plate projections $f$, bifurcated transversely of the truck.

G, G, (see Figs. 8 and 11) indicate counter rocker plates, with the rockers bifurcated in like manner and having teeth $g$, interlocking with teeth $f'$, on the plates D and D', in a manner similar to that described in my patent dated January 5, 1892, No. 466,349, except that the teeth are arranged at the sides of the rocker projections, as shown, instead of in the central slit or groove. The rockers are shown rounded down to the plate at the center and cut away at the sides, to give the necessary strength and bearing surface, without unnecessary weight of metal. The faces of plates G and G', opposite the rockers are provided each with an annular flange $g^2$, adapting it to engage and retain one end of a spiral spring H, or H', one of which is located directly over the other, the two being connected by a flanged coupling ring I, (see Fig. 6.) One of these springs (H') as will be seen is made, preferably, from a rod or wire of less diameter, or one spring may be of less diameter, or greater pitch than the other, for the purpose of breaking the continuity of vibration in the spring while, by making the adjoining ends to snugly grasp the ring flanges, the spring itself is extended to the desired length.

Plates J and J', are secured to the lower faces of the car side sills, directly over the plates D and D', and these are provided with rockers $j$, similar to those above described and are connected, with the springs, through the rocker plates G'. These plates J have fixed longitudinal ribs $j'$ on their upper faces, having lateral rigid braces $j^2$, on one side, and on the other, adjustable, braced ribs $j^3$, through which the plates are firmly secured to the car sills, by through bolts $j^4$, the adjustable ribs $j^3$ allowing for variation in the thickness of the sill.

K, K, indicate the journal boxes having long wings or brackets $k$, $k'$, on their sides, through which they are secured to the wheel pieces midway between the end springs and the pairs of central springs, on each side of the latter, as shown. By this arrangement the spring base is materially extended in length beyond the wheel base and by the arrangement of the springs, as shown and described less than one-third of the weight of the car will be supported at either end of the truck. Perforations at $J^2$, provide for greater play or vibration of the car sills relative to the wheel piece and heads of bolts $d^3$. Malleable metal plates L, are secured to the down faces of the end sills E, having perforations at $l$, which engage the nuts on the bolts at $d^3$, and serve to lock them against displacement. The bolts at $d^4$, also pass through these plates, and, the ends of said plates, being turned down, as shown at $l'$, Fig. 4, against the nuts on said bolts, the plates serve also to lock said nuts in place.

In constructing the frame of this improved truck, I use the double channel iron wheel piece of my Patent No. 423,158, referred to, and secure the journal boxes to this wheel piece by long wings formed on the sides of the journal boxes and projecting therefrom, by means of which the wheel pieces are greatly strengthened over the journal boxes, where they are subjected to the greatest strain by the action of the extended spring base. The extended spring base permits the extension of these long wings from the journal box to strengthen the wheel piece over the car wheels. This extended spring base I use to steady the car body and I find it important for this purpose that less than one-third of the weight of the car body and load should rest upon the the spring base extensions and more than one-third should be carried at or near the the center of the side sills of the car body. I find that the necessity for this peculiar distribution of the weight, consists first, in the fact that if all the weight of the car body and load could be supported at or near the centers of the wheel pieces, there would be no cause for longitudinal rocking of the car body in the operation of the car, but the car body would lack stability and, with an unevenly distributed load, would not assume a level position and to remedy or avoid this second result and utilize the first to as great an extent as practicable, I leave only sufficient weight bearing on the ends of the spring base extensions, to prevent the car body from drooping over in either direction, longitudinally and thereby keep it approximately level. These important results are accomplished by the construction and arrangement described and shown.

My improvements in this truck, therefore consist in the peculiar construction and arrangement of the parts adapting it to carry on each wheel piece less than one-third of the weight of one side of the car on each spring base extension and more than one-third of said weight at or near the center of the wheel piece by which construction I avoid or diminish the cause of longitudinal rocking and support the car body at the ends of the spring base extensions, sufficiently to prevent continuous drooping of either end of the car body when the load is unevenly distributed. I find one other element of construction necessary to eliminate the tendency to rock the car body longitudinally, and to improve the riding of the car by breaking the continuity of vibration between the car body and wheel. This result may be better understood by comparing it to the familiar fact of the accumulation of force by the regular step of a military company crossing a bridge, which is avoided by changing into an irregular step.

I find it better to locate the draft links at the centers of the front and rest sills to give each end of the truck greater freedom to vibrate laterally, and I therefore attach one of my flexible draft links, $s$, embraced in my application filed February 12, 1891, Serial No. 381,169, to the center of each end truck sill and the opposite ends of said draft links to a bracket extending down from the car body in the usual manner.

Having thus described my invention, I claim—

1. In a truck for four wheel, electric or cable cars, a wheel piece extended beyond the journal boxes at either end to form an extended spring base truck frame, in combination with journal boxes having long double wings extending out laterally therefrom, and the springs located on each side and beyond the ends of the said wings, substantially as and for the purposes described.

2. In a car truck for four wheel, electric or cable cars, a wheel piece extended beyond the journal at either end to form an extended spring base truck frame, in combination with springs supported by the wheel piece and arranged in such manner as to adapt them to carry more than one third of the weight of the car body and load at or near the longitudinal center of the truck and car body and less than one third at each outer end of the extended spring base, whereby the longitudinal rocking of the car body is diminished, substantially as described.

3. In a car truck, the wheel pieces extending along the sides of the truck and having spring seats attached to their lower faces and projecting laterally on both sides thereof, in combination with springs located on both sides of the wheel pieces and adapted to permit the truck to vibrate horizontally, substantially as described.

4. The combination of the car, the wheel pieces having laterally extended spring seats attached thereto and located on both sides thereof, with rocker caps and springs adapted to permit greater lateral vibration of the car truck, substantially as described.

5. The spring seat plates on the lower sides of the wheel pieces adapted to support the springs and to lock the wheel pieces and cross sills together to form a diagonally stiff frame, substantially as described.

6. The projecting cross sills located under the wheel pieces and attached thereto in combination with the spring seats, substantially as described.

7. The combination of two coil springs of different stiffness located one above the other with the ring I formed with upwardly and downwardly projecting annular flanges for holding them in proper relative position, substantially as described.

8. The combination of the triple nut-lock-plate with the three bolts and nuts, securing the wheel piece, cross sill and spring seat, substantially as described.

9. The horizontal flexible draft links attached, one to each end of the truck frame near the center of the end sill and its opposite end to the car body, substantially as described.

10. In an extended spring base truck, the combination of I-beam shaped wheel pieces with cross sills having flat upper surfaces projecting beyond the wheel pieces, to which they are firmly secured by the lock and rocker plates shown at Fig. 9.

11. The combination with car springs located along the sides of the wheel pieces, of the upper spring seats projecting both inwardly and outwardly from the car body side sill and having permanent stiffening brackets on the plate on one side and adjustable stiffening brackets located on the other side of the car body sill, for stiffening the upper spring seats, substantially as described.

12. A car truck having an extended spring base, in combination with the vertical spiral end spring composed of two sections, one section being adapted to vibrate more rapidly and freely than the other, substantially as and for the purpose described.

13. In an extended spring base car truck, the combination of the wheel pieces with the journal boxes having long, double wings extended laterally therefrom along under the wheel pieces and firmly secured thereto, and the springs located beyond the ends of said wings and arranged to support less than one third of the weight of the car body and load at each outer end of the extended spring base and more than one third at or near the centers of the wheel pieces, substantially as described.

14. A double or compound spring, made in two parts united by a ring formed with upwardly and downwardly projecting, annular flanges, in combination with and interposed between the car body and car wheels, substantially as and for the purposes described.

15. In an extended spring base car truck, the combination of the straight, extended wheel piece resting upon and secured to the long, projecting wings of the journal box, with springs located on both sides of said wheel piece and resting upon spring bases secured to the under side of said wheel piece, substantially as and for the purposes described.

In testimony whereof I have hereunto set my hand this 30th day of August, A. D. 1892.

MOSES G. HUBBARD.

Witnesses:
REXFORD M. SMITH,
GEO. W. CLEMENT.